UNITED STATES PATENT OFFICE.

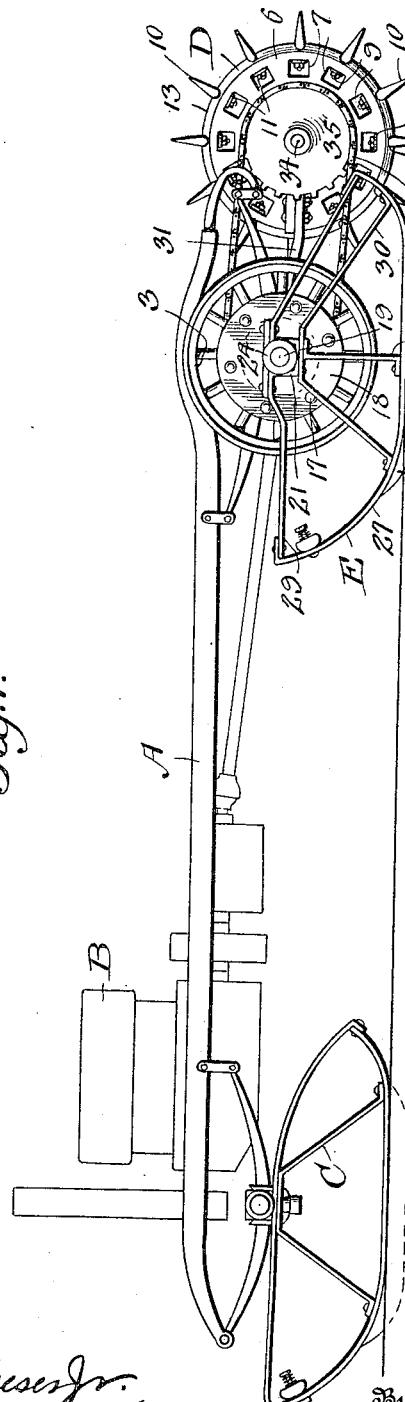

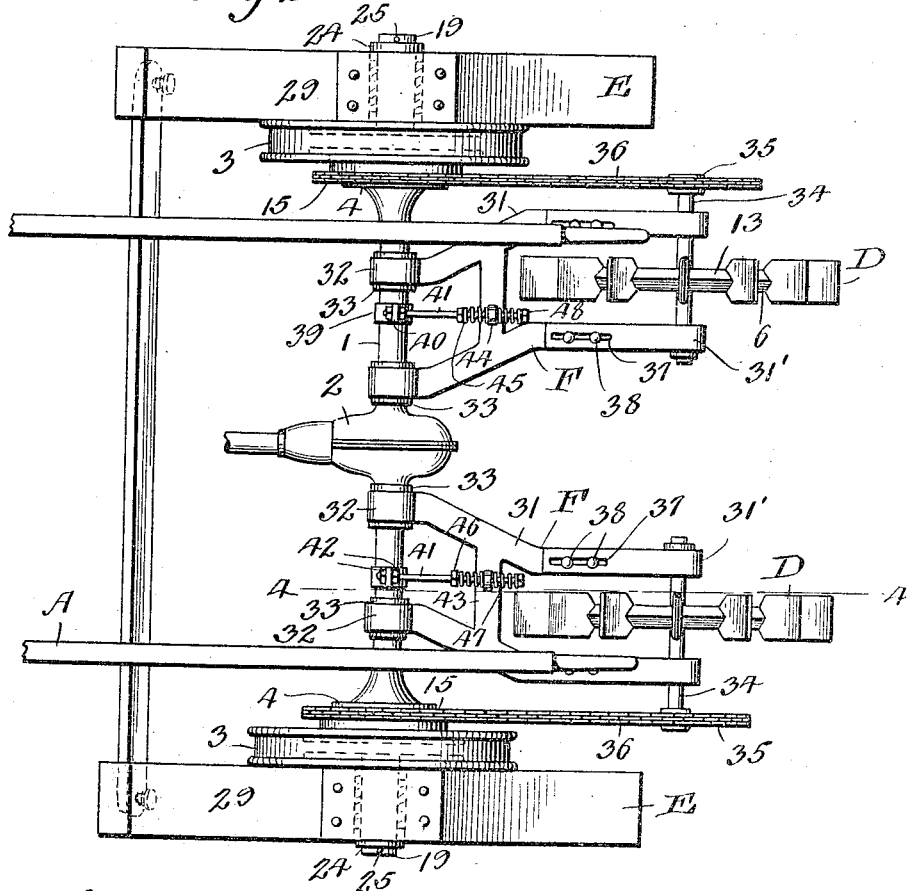

EUGENE FORREST, OF BRIMLEY, MICHIGAN, ASSIGNOR OF TWO-EIGHTHS TO TREFFLEY FORREST, ONE-EIGHTH TO CARL FORREST, AND ONE-EIGHTH TO ALFRED FORREST, SR., ALL OF BRIMLEY, MICHIGAN.

MOTOR-SLEIGH.

1,210,922.  Specification of Letters Patent.  Patented Jan. 2, 1917.

Application filed March 14, 1916. Serial No. 84,182.

*To all whom it may concern:*

Be it known that I, EUGENE FORREST, a citizen of the United States, residing at Brimley, in the county of Chippewa and State of Michigan, have invented new and useful Improvements in Motor-Sleighs, of which the following is a specification.

The object of the present invention is to provide in connection with the frame and front runner construction of a motor sleigh, novel means for mounting the rear bob sled in relation to the frame and novel driving mechanism actuated by an engine on the machine frame, the rear bob sled and driving mechanism hereinafter described being adapted to be applied to the rear construction of an automobile or similar vehicle without removing the driving wheels of such vehicle, and utilizing the power of the engine with which the vehicle is already equipped.

With the above and other objects in view, the invention consists in the novel construction, combination and arrangement of parts, as herein described, illustrated and claimed.

In the accompanying drawings:—Figure 1 is a side elevation of the chassis of an automobile, illustrating the present invention as applied thereto. Fig. 2 is a plan view of the rear portion thereof. Fig. 3 is a fragmentary vertical section taken about in line with the driving axle of the vehicle and showing the relation of one of the runners to one of the driving wheels of the vehicle. Fig. 4 is a fragmentary vertical longitudinal section through the rear portion of the same, showing the manner of mounting and operating the traction or driving wheels. Fig. 5 is a fragmentary side elevation of one of the traction wheels. Fig. 6 is a detail perspective view of one of the traction teeth.

Referring to the drawings A designates generally the chassis or frame of a motor vehicle, B the engine and C the front bob sled.

1 designates the rear axle housing, 2 the casing of the differential gearing, 3 the driving wheels of the vehicle, 4 the brake drums and 5 the driving axle, all of said parts being of the usual construction and arrangement in accordance with the present day automobile practice.

In order to apply the driving mechanism of my invention to an automobile, it is preferred to remove the tires from the driving wheels 3 although this is not essential.

In the preferred embodiment of the invention, I employ a pair of traction wheels each of which is designated generally at D and the construction of which is best illustrated in Fig. 5. Each traction wheel comprises a body 6 formed with a circular series of openings 7 extending transversely therethrough and intersected by radial bores 8 which receive the shanks 9 of a corresponding number of traction teeth 10 each having a considerable breadth or extent transversely of the wheel so as to obtain a broad grip on the road surface. The shank 9 of each tooth 10 is threaded to receive a nut 11 which is used in conjunction with a washer 12 in the respective opening 7 to securely fasten the traction tooth in place. The periphery of the body of the traction wheel is beveled or substantially V-shaped in cross section as indicated at 13 and is also formed with notches 14 to receive the rounded inner edges of the teeth 10. The teeth are thus prevented from turning relatively to the body of the wheel while the beveled periphery 13 of the wheel serves to clear off the snow and prevent the same from adhering to the body of the wheel and accumulating between the traction teeth 10.

15 designates a pair of sprocket wheels each of which surrounds one of the brake drums 4 as best shown in Fig. 3. Each sprocket wheel 15 is provided with a flange 16 through which are inserted bolts 17 which also pass through a disk-shaped flange 18 at the inner end of an axle cap 19, the latter surrounding the end portion of the driving axle 20. The cap 19 also constitutes a journal for the adjacent rear runner designated generally at E, the top bar of said runner being formed to receive a journal box 21 containing a bushing 22 within which are roller bearings 23 which surround and roll upon the combined axle cap and journal 19. The runner E is held in place by means of a retaining washer 24 and a pin 25 extending through the member 19, 26 designating a gasket to retain lubricant for the rollers 23. The bolts 7 pass between the spokes of the wheel as clearly indicated in Fig. 3, thus enabling the mechanism to be mounted upon the driving wheel of an automobile without any alteration of any part of the vehicle itself.

Each of the rear runners comprises in addition to the shoe 27, a fin 28 extending longitudinally of said shoe and downwardly therefrom to prevent lateral skidding and also comprises a top bar or run 29 and bracing knees 30.

Journaled on the rear axle housing 1 are two traction wheel frames each of which is designated generally at F and which in the preferred embodiment thereof comprises arms 31 arranged in spaced relation to each other and provided at their forward extremities with bearing sleeves 32 which encircle the rear axle housing and are held against movement longitudinally of said housing by means of stop collars 33. Each of the frames F is laterally offset so as to bring the rear portion thereof closer to the vehicle wheel and runner at that side of the machine. The shaft 34 of each wheel is journaled in the rear extremities of the arms 31 of the traction wheel frame and has fast thereon a sprocket wheel 35 from which a sprocket chain 36 extends around the sprocket wheel 15 above referred to and having a fixed relation to the adjacent driving wheel of the vehicle. Each of the arms 31 is also made longitudinally extensible, the rear portions or sections 31′ of said arms having an overlapping relation to the forward portion of the arm and being formed with a longitudinal slot 37 to receive one or more fastening bolts 38. The construction just described provides for tightening each of the driving chains 36.

Each of the traction wheels D is held normally depressed by the means best illustrated in Fig. 4, said means comprising a collar 39 clamped tightly around the rear axle housing and having an upstanding ear 40 through which is inserted a rod 41 secured in place relatively to the ear 40 by means of nuts 42 at opposite sides thereof. The arms 31 are connected by a cross bar 43 which has an upstanding post 44 thereon formed with an opening through which the rod 41 may slide substantially in the direction of its length.

Bearing against the forward side of the post 44 is a traction wheel depressing spring 45 confined in place by a tensioning nut 46 or its equivalent on the rod 41. Bearing against the opposite or rear side of the post 44 is a cushioning or check spring 47 held in place and adjustable as to its tension by means of a nut 48 or the equivalent thereof on the rod 41.

From the foregoing description, taken in connection with the accompanying drawings, the operation of the mechanism hereinabove described will now be clear. The sprocket wheels 15 are centered by the brake drums and are bolted in conjunction with the adjacent runner carrying connections directly to the driving wheels of an automobile or similar vehicle. The driving chains extend directly from said sprocket wheels to the sprocket wheels on the shafts of the traction wheels. The last named shafts are journaled in the traction wheel frames which are pressed yieldingly downward by the depressing springs 45 thereby obtaining the necessary tractive hold on the road surface. In case of ruts or holes in the road surface, the check springs 47 prevent the traction wheels from dropping sufficiently to cause injury thereto, or, in other words, the traction wheels are yieldingly supported as well as yieldingly depressed. Furthermore, the runners are mounted so as to be capable of rocking in a fore and aft direction or on a transverse horizontal axis with respect to the machine frame so as to accommodate themselves at all times to uneven surfaces in the road bed. Any desired tension may be imparted to the springs 45 by means of the tensioning devices 46 in accordance with varying conditions of the road surface.

Having thus described my invention, I claim:—

1. The combination with the rear axle housing of a motor vehicle, of a pair of traction wheel frames journaled on said axle housing at opposite sides of the center thereof, said traction wheel frames being laterally offset in opposite directions toward their rear extremities, traction wheels journaled in the free ends of said frames, a sprocket wheel on the shaft of each traction wheel, a driving sprocket wheel encircling the brake drum of the adjacent driving wheel of the vehicle, chains connecting the driving sprocket wheels with those on the shafts of the traction wheels, runners located outside of the driving wheels of the vehicle, bearings for said runners having disk-shaped flanges, and bolts extending between the spokes of the driving wheels and serving to fasten the sprocket wheels and said flanges in fixed relation to the vehicle driving wheels.

2. The combination with the driving wheel of a motor vehicle, of a sleigh runner, a journal box on said runner, a combined axle cap and journal mounted in said box and having a disk-shaped flange at one end, said cap fitting over one extremity of the driving axle of the vehicle, a sprocket wheel fitting around the brake drum and provided with a flange, bolts extending through said flanges and serving to secure the sprocket wheel and said combined axle cap and journaled in fixed relation to the driving wheel of the vehicle, a traction wheel frame journaled on the rear axle housing and extending rearwardly therefrom, a traction wheel carried by the free end of said frame, a sprocket wheel on the shaft of said traction wheel, and a drive chain extending around both of said sprocket wheels.

In testimony whereof I affix my signature in presence of two witnesses.

EUGENE FORREST.

Witnesses:
ARCHIE E. MILLER,
THOMAS MANSFIELD.

Copies of this patent may be obtained for five cents each, by addressing the "Commissioner of Patents, Washington, D. C."